(12) United States Patent
Ugajin

(10) Patent No.: US 6,581,002 B2
(45) Date of Patent: Jun. 17, 2003

(54) INFORMATION PROCESSING METHOD AND INFORMATION PROCESSING APPARATUS

(75) Inventor: Ryuichi Ugajin, Tokyo (JP)

(73) Assignee: Sony Corporation, Tokyo (JP)

(*) Notice: Subject to any disclaimer, the term of this patent is extended or adjusted under 35 U.S.C. 154(b) by 99 days.

(21) Appl. No.: 09/775,784

(22) Filed: Feb. 2, 2001

(65) Prior Publication Data

US 2001/0034578 A1 Oct. 25, 2001

(30) Foreign Application Priority Data

Feb. 3, 2000 (JP) .......................... 2000-032698

(51) Int. Cl.$^7$ ................................ G11B 9/00
(52) U.S. Cl. .................. 701/209; 701/200; 701/202; 340/990
(58) Field of Search ................... 701/209, 200, 701/201, 202, 206, 210; 340/990, 995

(56) References Cited

U.S. PATENT DOCUMENTS

| | | | | |
|---|---|---|---|---|
| 4,962,458 A | * | 10/1990 | Verstraete | 701/200 |
| 4,984,168 A | * | 1/1991 | Neukrichner et al. | 340/995 |
| 5,036,471 A | * | 7/1991 | Tamura et al. | 340/995 |
| 5,255,349 A | * | 10/1993 | Thakoor et al. | 326/35 |
| 5,272,638 A | * | 12/1993 | Martin et al. | 340/990 |
| 5,848,402 A | * | 12/1998 | Pao et al. | 706/13 |
| 5,938,720 A | * | 8/1999 | Tamai | 701/200 |
| 6,023,680 A | * | 2/2000 | Wooster et al. | 705/7 |

OTHER PUBLICATIONS

Papadimitriou et al., "On the Approximability of the Traveling Salesman Problem", Proceedings of the thirty–second annual ACM symposium on Theory of computing, May 1999, pp. 126–133.*

Papadimitriou et al., "Some Complexity Results for the Traveling Salesman Problem", Proceedings of the eighth annual ACM symposium on Theory of computing, May 1976, pp. 1–9.*

Penna, T.J.P., "Traveling salesman problem and Tsallis statistics", Physical Review E, Third Series, vol. 51, No. 1, Jan. 1995, pp. R1–R3.*

Yoshiyuki et al., "New Method of Solving the Traveling Salesman Problem Based on Real Space Renormalization Theory", Physical Review Letters, vol. 75, No. 9, Aug. 28, 1995, pp. 1683–1686.*

Fox et al., "Load Balancing Loosely Synchronous Problems with a Neural Network", Proceedings of the third conference on Hypercube concurrent computers and applications, vol. 1, Feb. 1988, pp. 241–278.*

Garfinkel et al., "The Bottleneck Traveling Salesman Problem: Algorithms and Probabilistic Analysis", Journal of the Assoc. for Computing Machinery, vol. 25, No. 3, Jul. 1978, pp. 435–448.*

* cited by examiner

*Primary Examiner*—Michael J. Zanelli
*Assistant Examiner*—Eric Gibson
(74) *Attorney, Agent, or Firm*—Frommer Lawrence & Haug LLP; William S. Frommer; Darren M. Simon (57) ABSTRACT

To obtain good approximate solutions of a combinatorial optimization problem such as traveling salesman problem and to enable its processing apparatus in form of massively parallel exclusive devices, an information carrier corresponding to the distribution of a plurality of points given on an n-dimensional space (n is an integer not smaller than 2), and time development and time reversal of the information carrier are used to process the information. The information carrier may be the density of particles or optical intensity corresponding to the distribution of the given points, and a diffusion process of the particles or a defocusing process is used as changes with time. The traveling salesman problem is solved by using this method.

6 Claims, 14 Drawing Sheets

(PRIOR ART)

FRAME NUMBER 5

FRAME NUMBER 7

Fig. 12

FRAME NUMBER 13

INFORMATION PROCESSING METHOD AND INFORMATION PROCESSING APPARATUS

BACKGROUND OF THE INVENTION

1. Field of the Invention

This invention relates to an information processing method and an information processing apparatus that are suitable when used for combination optimization problems such as traveling salesman problem, for example.

2. Description of the Related Art

Here is taken a problem in which the number N of its factors can be defined, as a problem for which a calculation should be executed. The problem for finding a route shortening the length of each line connecting points among routes once passing all of a plurality of points given on a two-dimensional plane is typical one of such problems, and the number of given points is represented by N. Considering these points as positions of cities, the problem of finding the shortest route is sometimes called a traveling salesman problem.

In general, in case that the calculation time required for executing a solution by naive algorithm increases by power of N, the problem is called a polynominal problem. On the other hand, in case that the calculation time increases exponentially of N, the increase of the calculation time with the increase of N is remarkable, and it is difficult to execute numerical calculation using a conventional computer. The class containing this problem is called NP (nondeterministic polynominal) complete problem. The complete NP problem has the possibility of becoming a polynominal problem if a dexterous algorithm is found, and vigorous researches are being made. It is important that, once any dexterous algorithm is found, all of the problems known as NP complete problems are shown to become polynominal problems.

Figure 1:
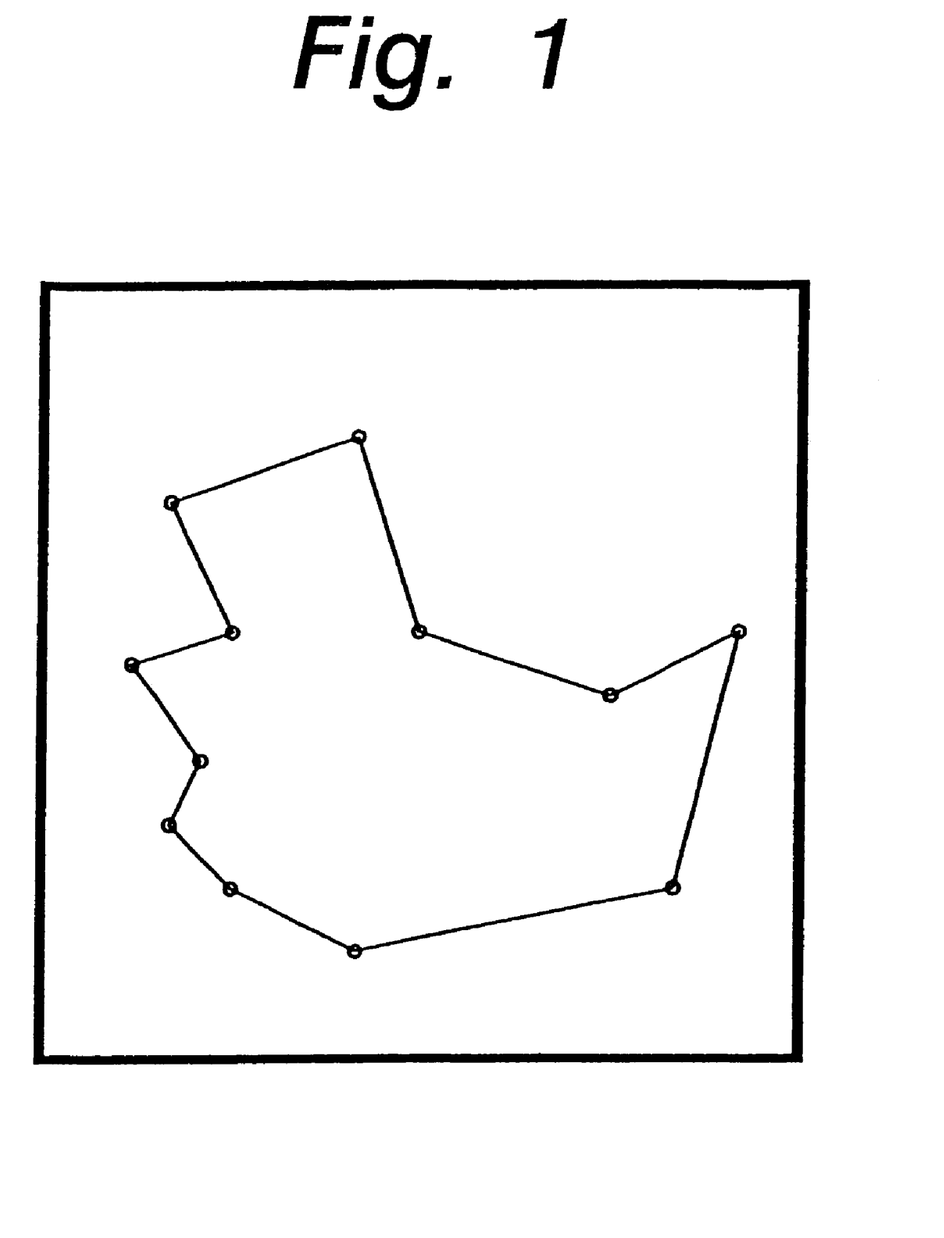
FIG. 1 is a schematic diagram that explains a traveling salesman problem.

The subject of the widest researches as an NP complete problem is the traveling salesman problem mentioned above. An example thereof is schematically shown in FIG. 1. In FIG. 1, white points represent positions of cities, and the set of lines each connecting two cities is the shortest route. To solve this kind of problem, various approximate methods have heretofore been proposed, such as those using neural networks or spin glass.

Figure 2:
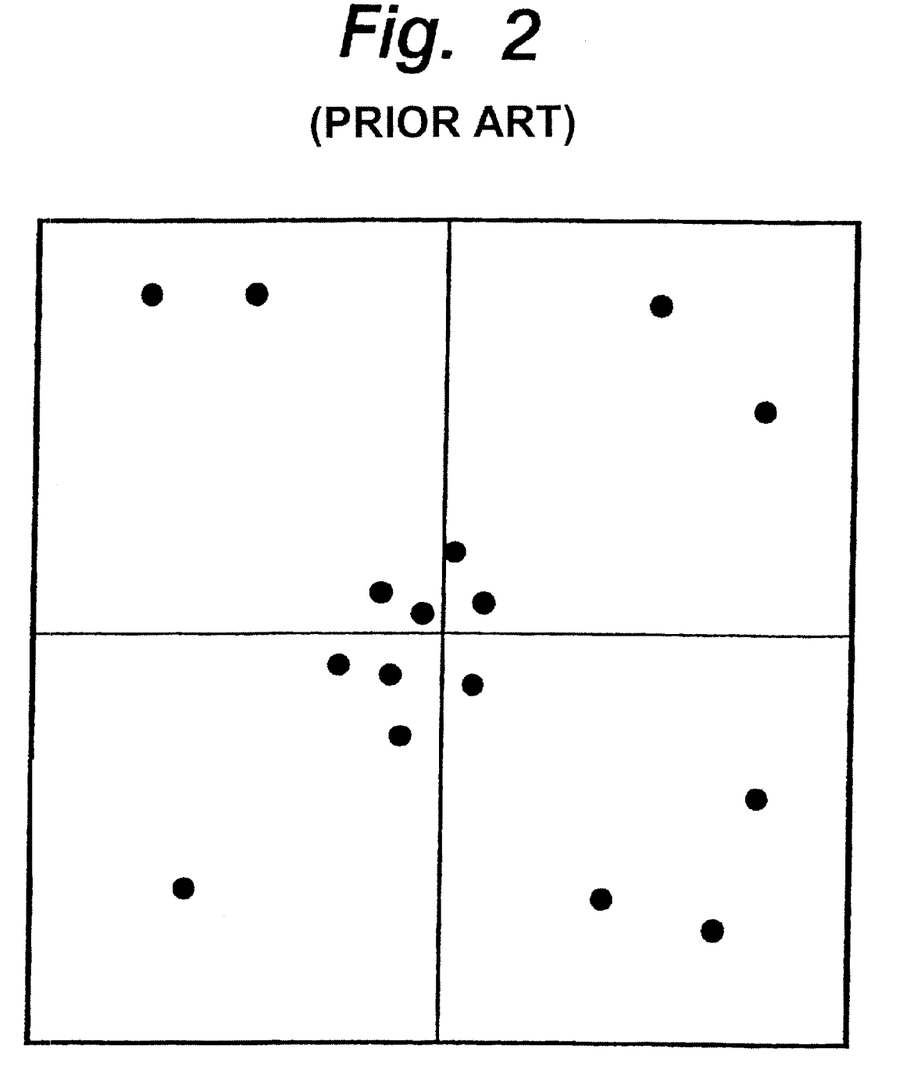
FIG. 2 is a schematic diagram that explains a method of solving a traveling salesman problem by renormalization transformation using fixed frames.

Recently, a new approximate method using the concept of renormalization group was found by Y. Usami and Y. Kano regarding the traveling salesman problem and has been remarked (Phys. Rev. Lett. 75, 1683 (1995)). The renormalization group is a method that has performed its power in analyses like phase transition, and it is a basic concept of modern physics. FIG. 2 schematically shows this method. In FIG. 2, black points represent positions of cities. This method divides a given distribution of cities into some regions called frames, and executes calculation for each frame to obtain an approximate solution. In the example of FIG. 2, a distribution is divided into four frames.

The approximate method using renormalization group is certainly excellent in capability of obtaining a solution more quickly than conventional methods. However, since it executes calculation for fixed frames, approximation accuracy cannot be increased so much, and it is difficult to realize an apparatus for execution and processing by a physical system as an exclusive device.

OBJECT AND SUMMARY OF THE INVENTION

It is therefore an object of the invention to provide an information processing method and an information processing apparatus capable of quickly obtaining excellent approximate solutions of a combinatorial optimization problem such as traveling salesman problem and enabling realization of the processing apparatus as massively parallel exclusive devices.

Toward attainment of the above-mentioned object, the Inventor developed the concept of the above-indicated renormalization group, then contrived the use of a new renormalization transformation using movable frames instead of fixed frames and found the possibility of using this technique to obtain approximate solutions of combinatorial optimization problems such as traveling salesman problem with a high accuracy and at a high speed, which is just the present invention.

According to the first aspect of the invention, there is provided an information processing method comprising: preparing an information carrier corresponding to a distribution of a plurality of points given on an n-dimensional space (where n is an integer not smaller than 2); and using time development and time reversal of the information carrier to process the information.

According to the second aspect of the invention, there is provided an information processing apparatus configured to prepare an information carrier corresponding to the distribution of a plurality of points given on an n-dimensional space (where n is an integer not smaller than 2), and to use time development and time reversal of the information carrier for processing the information.

In the present invention, global nature of information given on an n-dimensional space, in particular, is detected by preparing an information carrier corresponding to a distribution of a plurality of given points and using the time development and time reversal of the information carrier.

In the present invention, the information carrier may be the density of particles (such as atoms or molecules) corresponding to a distribution of a plurality of given points, and its diffusion process may be used as a time change (time development). Alternatively, the information carrier may be an optical intensity corresponding to a distribution of a plurality of given points, and its defocusing process may be used as the time change (time development).

In a typical example of the present invention, for a problem of finding a route minimizing the total length of lines connecting points from routes once passing all points given on the n-dimensional plane (traveling salesman problem), an information carrier corresponding to a distribution of the given points is prepared, and time reversal of the information carrier is used.

Information processing according to the invention is such that all of its processes can be executed with a computer (or IC), and so may be done. However, physical processes, such as defocusing process and diffusion process, can be executed by using an existent physical system.

According to the invention having the above-summarized structure, good approximate solutions of combinatorial optimization problems such as traveling salesman problem can be calculated at a high speed by thinning movable frames of renormalization transformation while moving them to meet with a given distribution of a plurality of points on an n-dimensional space, such as distribution of cities. Since the renormalization transformation can be executed by using time reversal of a simple physical phenomenon such as physical process like diffusion process or defocusing process, it can be realized in form of massively parallel exclusive devices.

DETAILED DESCRIPTION OF THE PREFERRED EMBODIMENTS

Prior to explaining embodiments of the invention, here is made a review about moving-frame renormalization transformation. This method generates frames in accordance with distribution of given cities, and deals with the problem, recognizing responses upon changes in size of the frames. As a possible method, discs are considered, which each have the radius R from each of cities $C_i$ (i=1, 2, ..., N) given on a two-dimensional plane (x-y plane), and a function taking 1 inside and 0 outside is used. A two-dimensional step function h (x, y; R) is defined as $$h(x, y; R) = \begin{cases} 1 & \text{when } \sqrt{x^2 + y^2} < R \\ 0 & \text{when } \sqrt{x^2 + y^2} > R \end{cases} \quad (1)$$

When the position of the i-th city is expressed by $(X_i, Y_i)$ (i=1,2, ..., N), $$G(x, y; R) = \sum_{i=1}^{N} h(x - X_i, y - Y_i; R) \quad (2)$$

is useful. However, this function is not differentiable, introduction of a differentiable function is convenient. For example, $$\varphi(x, y; R) = \frac{1}{1 + \exp[\beta(x^2 + y^2 - R^2)]} \quad (3)$$

is a candidate. Equation (4) made by using Equation (3), namely, $$\Gamma(x, y; R) = \sum_{i=1}^{N} \varphi(x - X_i, y - Y_i; R) \quad (4)$$

is differentiable, and gradually approaches (x, y; R) in , β→∞. Γ(x, y; R) is a function that expresses initial city distribution with the accuracy R.

Here are remarked points $(P_j, Q_j)$ where r(x, y; R) has the maximum value. The number M(R) of points having the maximum value depends upon R. In R6∞, all of the cities are averaged, and it results in M(R→∞)=1. On the other hand, when R decreases, Γ(x, y; R) results in having values merely near cities, it results in M(R→0)=N. Let both these extremities be connected. As R decreases from ∞, a point having the maximum value will separate at a certain level, and it will result in M(R)=2. This occurs when distribution of cities is roughly divided into two groups and the distance of the groups becomes R. If R is further decreased, a point in one of the groups, which gives the maximum value, will separate, and it will result in M(R)=3. This occurs when distribution of cities is roughly divided into three groups and the distance among the groups becomes R. In this manner, as R changes from ∞ to 0, points giving the maximum value of Γ(x, y; R) progressively separate, and this finally terminates in the initial city distribution. Moving-frame renormalization transformation herein means that discs having the radius of R about points giving the maximum value of Γ(x, y; R) are considered as frames (moving frames) and they progressively move with changes of R (renormalization transformation). While executing the transformation, a branching diagram of points giving the maximum value is formed. By previously solving the traveling salesman problem for M(R)=k, the traveling salesman problem of M(R)=k+1 can be solved with reference to the solution for M(R)=k when branching occurs (M(R)=k→M(R)=k+1). That is, by solving a local problem of a portion where branching occurs, another solution is obtained by adding the remainder portion.

It is remarkable that this process can be realized by using defocusing in an optical system. If defocusing of an image of city distribution is progressed through a lens system, optical luminance profile obtained must be similar to Γ(x, y; R). Therefore, by taking an image of a city distribution with a video camera and oppositely rotating a movie made by defocusing, branching diagrams of points having the maximum luminance can be made progressively. Once such a branching diagram is obtained, it is the solution of the traveling salesman problem. Further, if it is recalled that, by progressing β→∞ with Γ(x, y; R), the result approaches the Gaussian distribution, it can be apparently realized with a diffusion system. For example, here is made a review about solutions of a two-dimensional diffusion process shown below.

$$\varphi(x, y; t) = \frac{1}{4Dt} \exp\left(-\frac{x^2 + y^2}{4Dt}\right) \quad (5)$$

Superposition of the solutions:

$$\Phi(x, y; t) = \sum_{i=1}^{N} \varphi(x - X_i, y - Y_i; t) \quad (6)$$

is also a solution of the diffusion equation:

$$\frac{\partial}{\partial t}\Phi = D\left(\frac{\partial^2}{\partial x^2} + \frac{\partial^2}{\partial y^2}\right)\Phi \quad (7)$$

Figure 3:
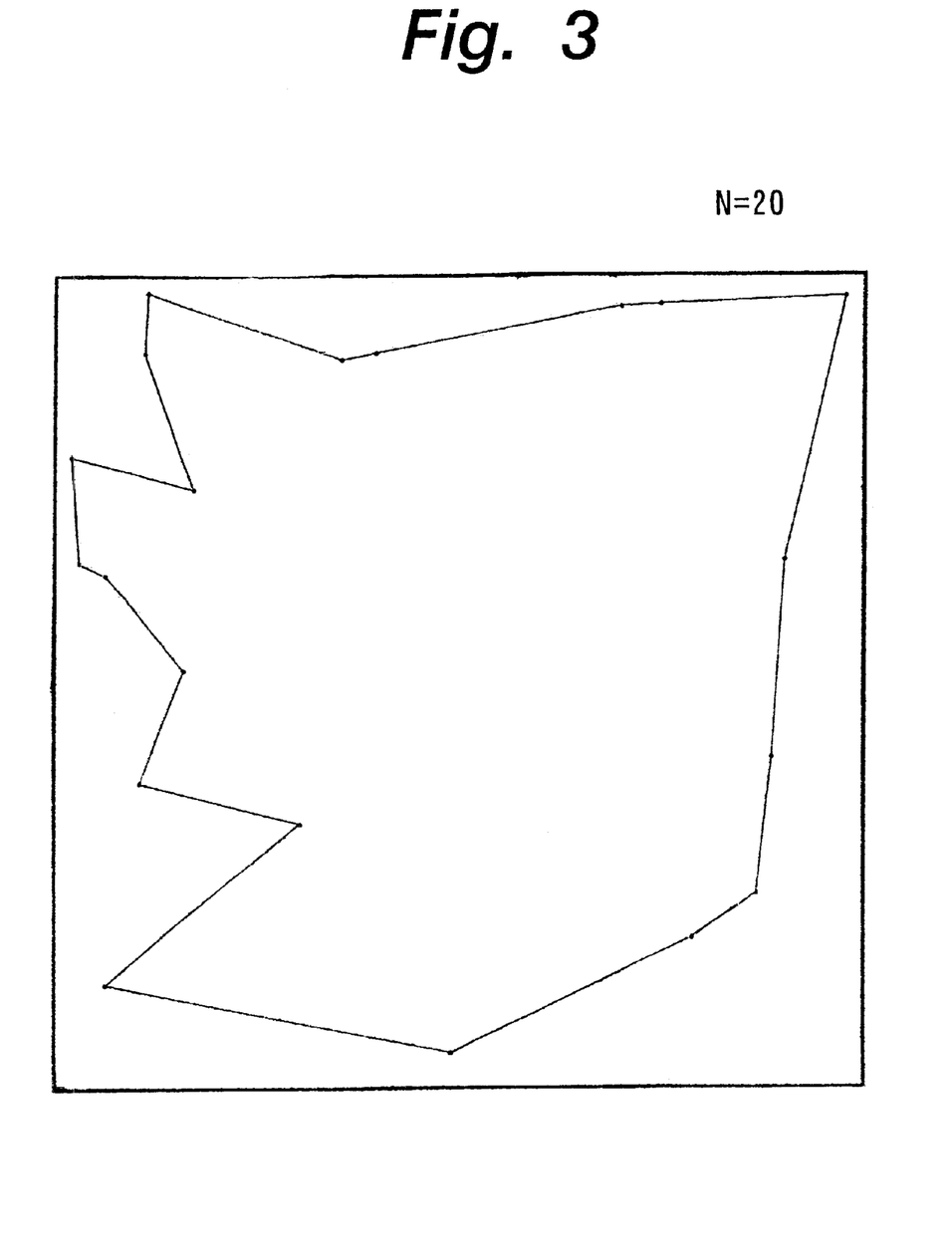
FIG. 3 is a schematic diagram that shows a solution of a traveling salesman problem using movable-frames renormalization transformation.
Figure 4:
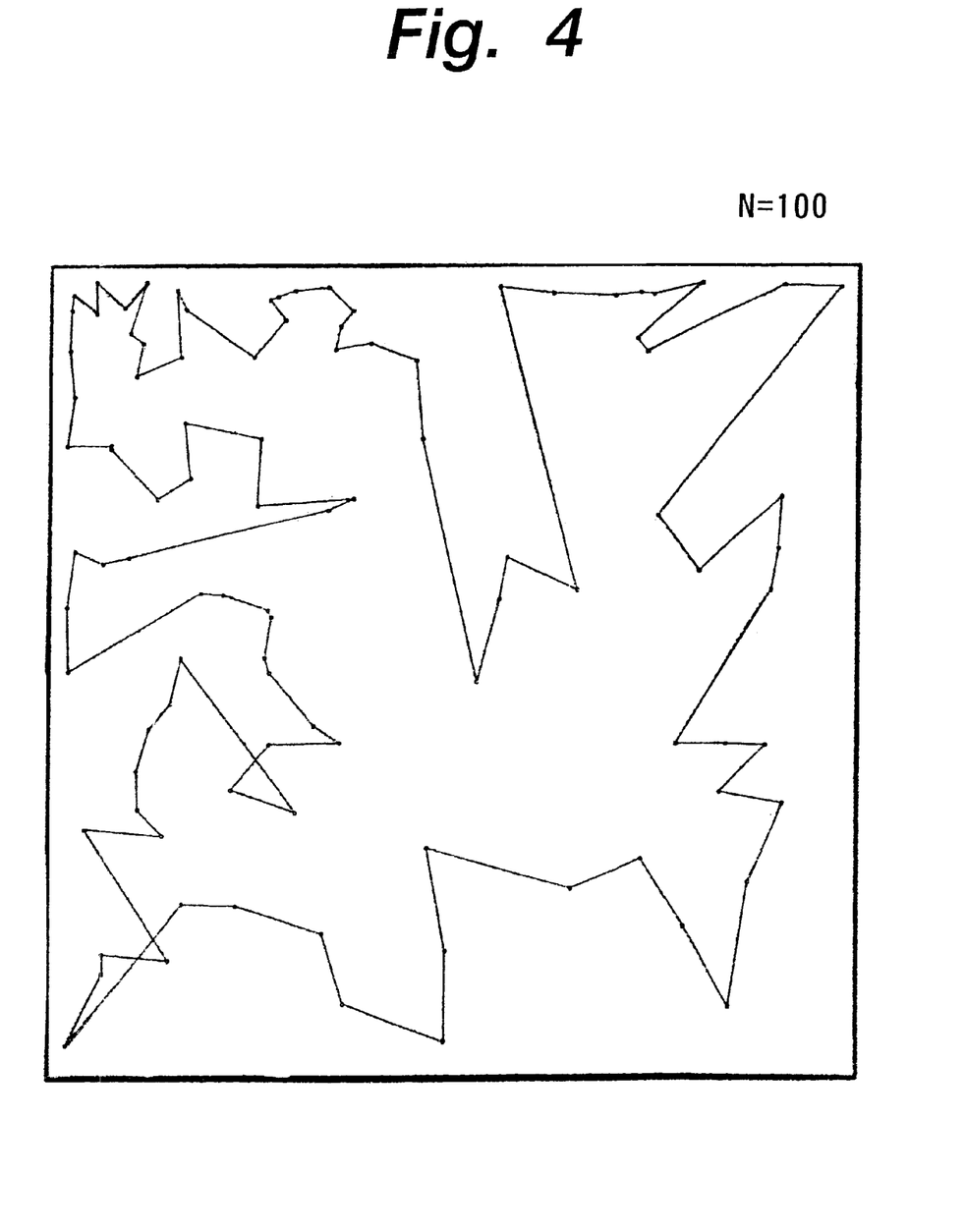
FIG. 4 is a schematic diagram that shows a solution of a traveling salesman problem using movable-frames renormalization transformation.
Figure 5:
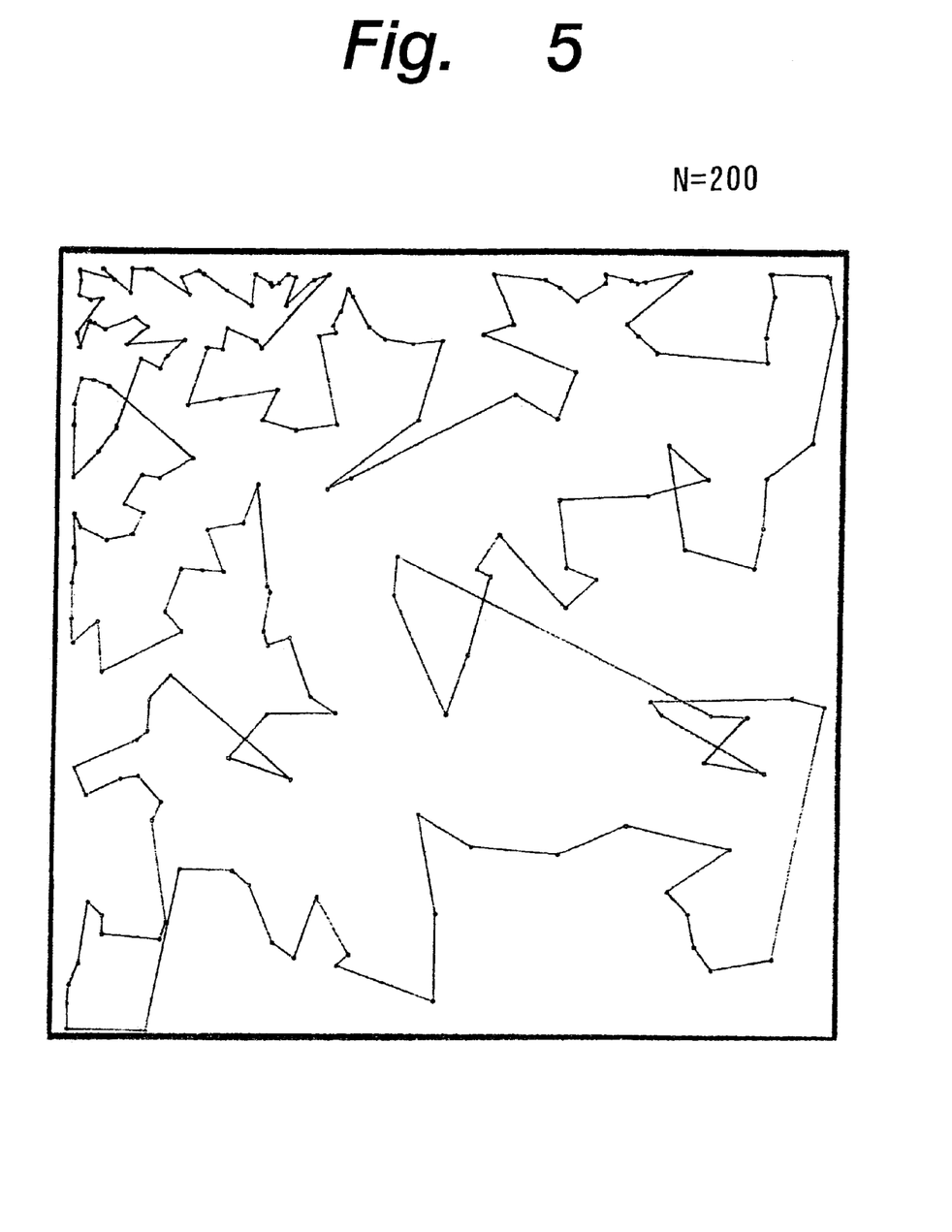
FIG. 5 is a schematic diagram that shows a solution of a traveling salesman problem using movable-frames renormalization transformation.

Assuming $t=R^2$, the same discussion can be developed. Therefore, also by using time reversal of the diffusion process, moving-frame renormalization transformation can be executed to solve the traveling salesman problem. FIGS. 3, 4 and 5 show examples of solution using a diffusion process when N=20, 100 and 200, respectively.

Figure 6:
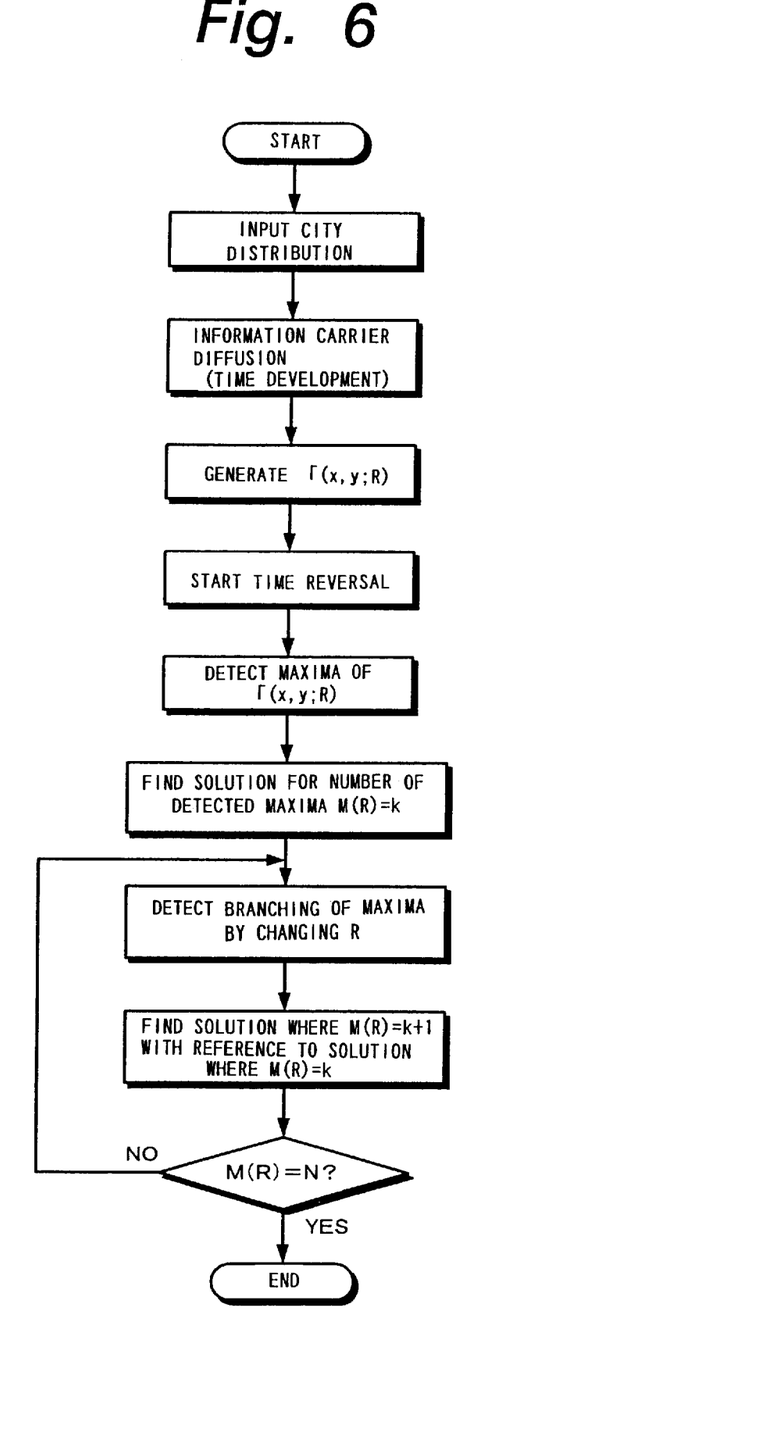
FIG. 6 is a flow chart that shows procedures of a method of solving a traveling salesman problem using movable-frame renormalization transformation.

A series of processing explained above can be shown by a flow chart of FIG. 6 as using a diffusion process.

Since the moving-frame renormalization transformation can be executed by using reverse transformation of a simple physical change such as defocusing or diffusion process, it can be realized by devices using a physical system. Then, by obtaining a solution of a traveling salesman problem, global nature of a given initial distribution can be grasped and detected.

A change with time of a distribution function of an information carrier is shown, taking the simplest case with two points as initial information. Let $(X_1, Y_1)=(-1, 0)$ and $(X_2, Y_2)=(1, 0)$ employed as those two points.

First shown is a change of an optical intensity distribution function in case of using defocusing in an optical system. This corresponds to the use of the step function:

$$\varphi(x, y; R) = \frac{1}{1 + \exp[\beta(x^2 + y^2 - R^2)]} \quad (8)$$

Figure 7:
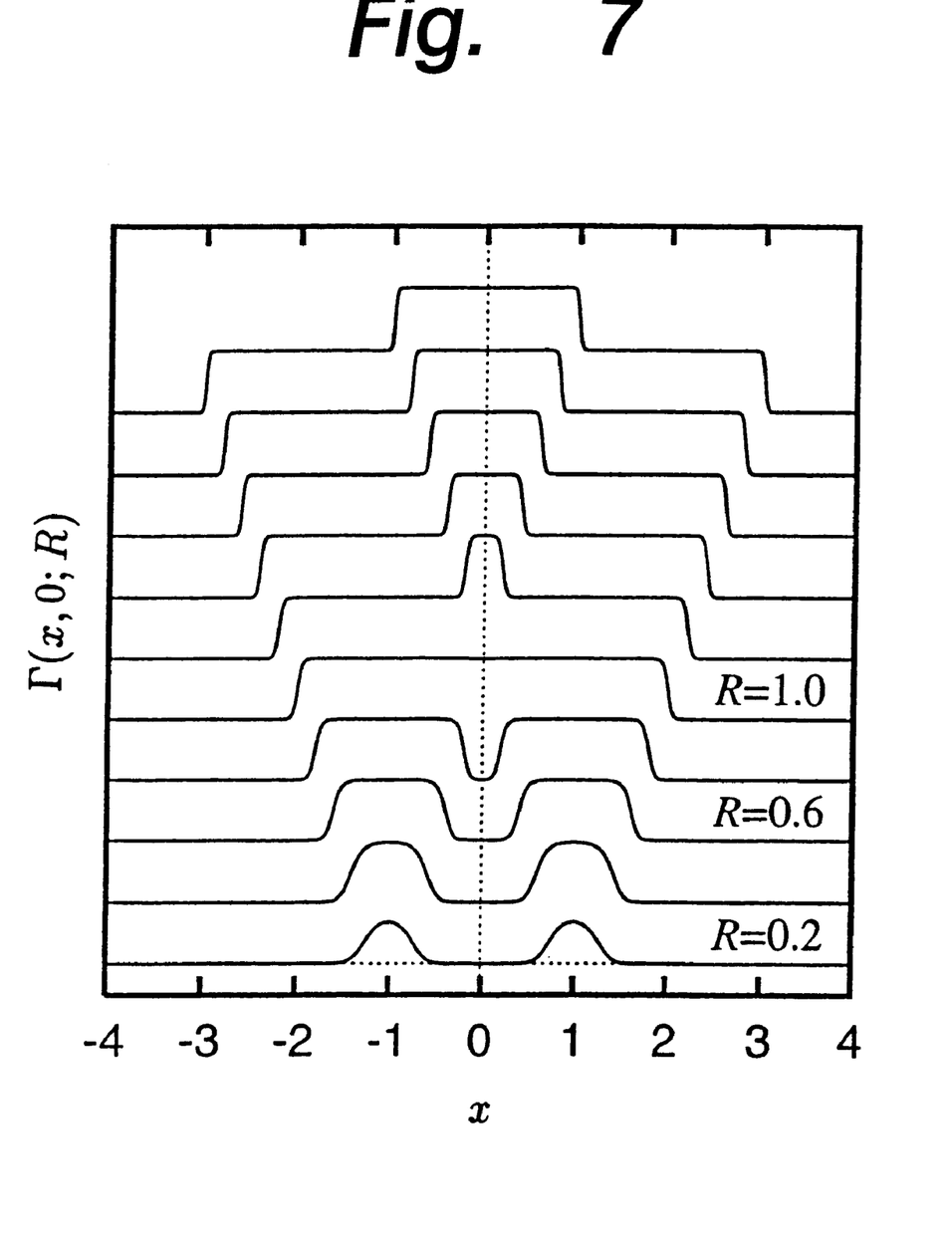
FIG. 7 is a schematic diagram that shows Γ(x, 0; R) upon a change of R.

As an example, FIG. 7 shows results of $$\Gamma(x, 0; R) = \sum_{i=1}^{2} \varphi(x - X_i, y - Y_i; R) \quad (9)$$

in which $\beta=20$, and R is 0.2, 0.4, 0.6, 0.8, 1.0, 1.2, 1.4, 1.6, 1.8 and 2.0, respectively. In FIG. 7, curves corresponding the respective values of R are shifted vertically for an easier view. It is known from FIG. 7 that the number points having the maximum value changes from two points to one point along with the increase of R.

Figure 8:
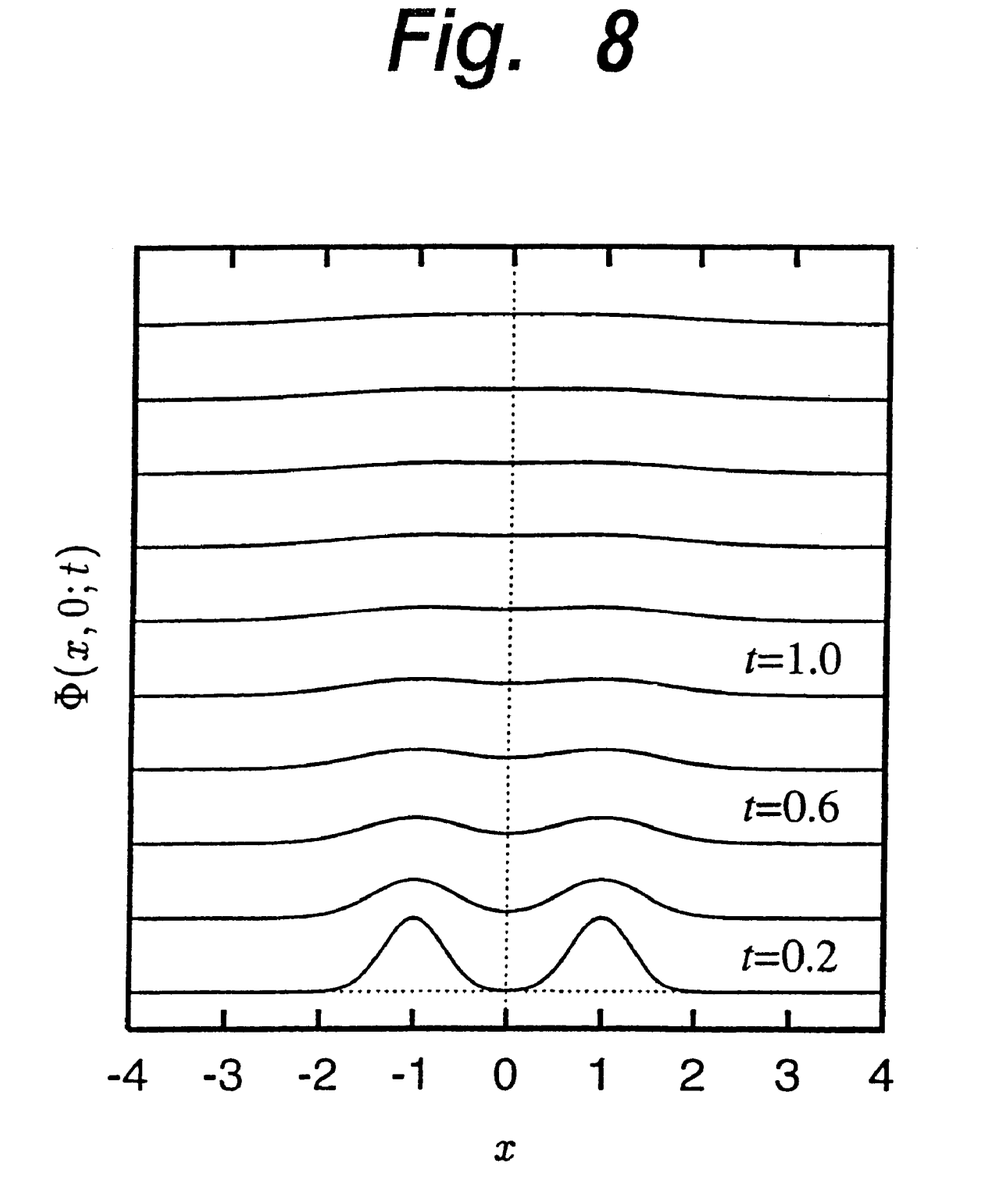
FIG. 8 is a schematic diagram that shows φ(x, 0; R) upon a change of t.

Next shown is a change of a grain density distribution function in case of using a diffusion system. Here is used D=¼ in:

$$\varphi(x, y; t) = \frac{1}{4Dt} \exp\left(-\frac{x^2 + y^2}{4Dt}\right) \quad (10)$$

and points given by $$\Phi(x, 0; t) = \sum_{i=1}^{2} \varphi(x - X_i, y - Y_i; t) \quad (11)$$

by changing t as 0.2, 0.4, 0.6, 0.8, 1.0, 1.2, 1.4, 1.6, 1.8 and 2.0, respectively, are plotted in FIG. 8. It is known from FIG. 8 that the number of points having the maximum value changes from two points to one point here again along with the increase of t.

Figure 9:
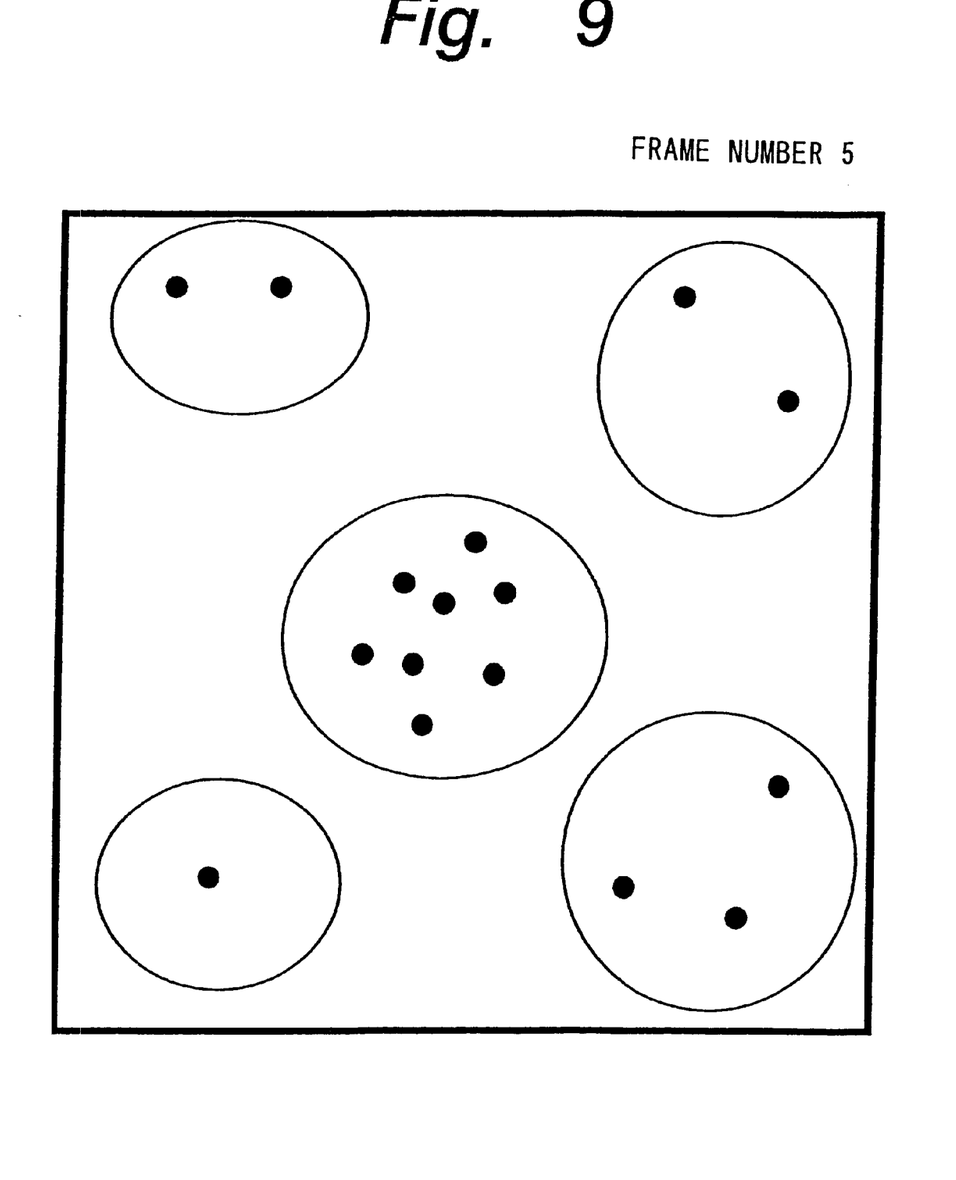
FIG. 9 is a schematic diagram for explaining a method of solving a traveling salesman problem using movable-frame renormalization transformation.
Figure 10:
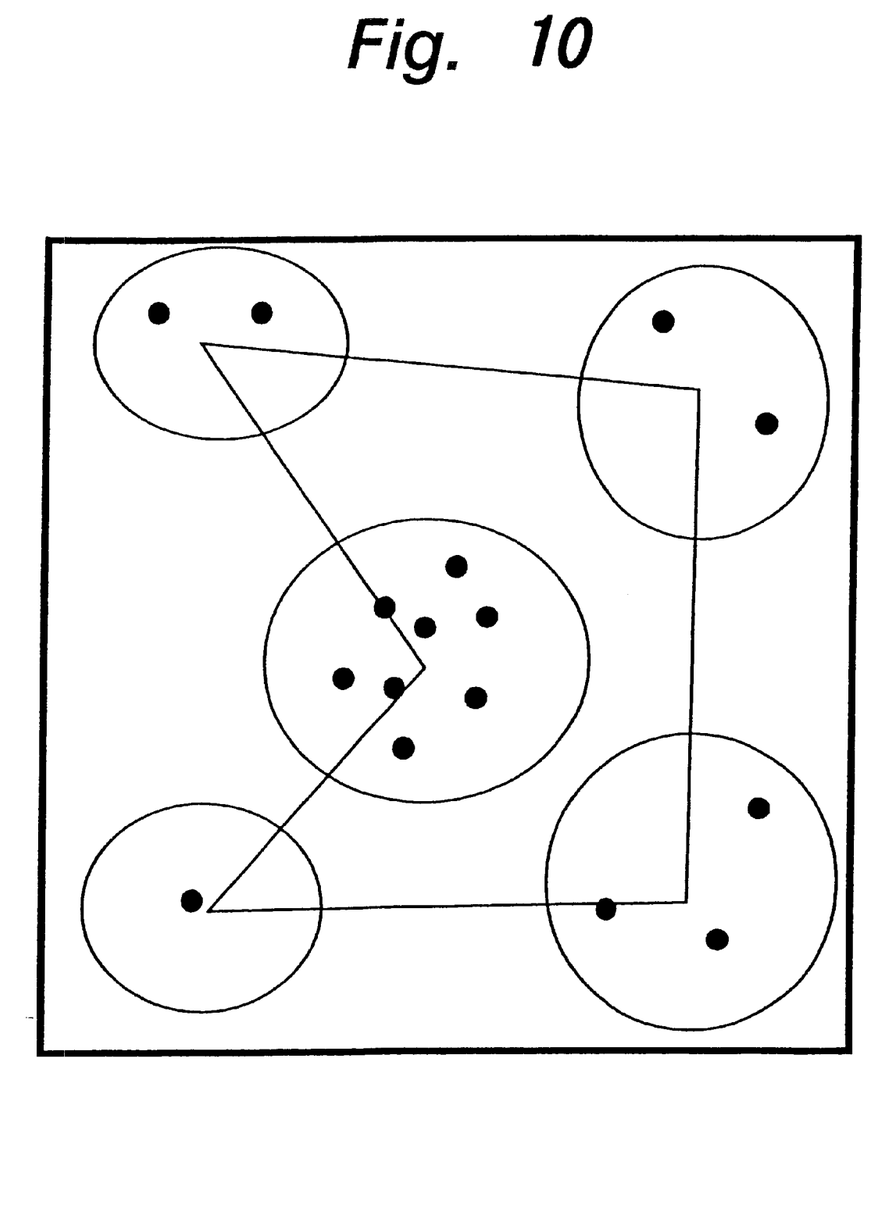
FIG. 10 is a schematic diagram for explaining a method of solving a traveling salesman problem using movable-frame renormalization transformation.
Figure 11:
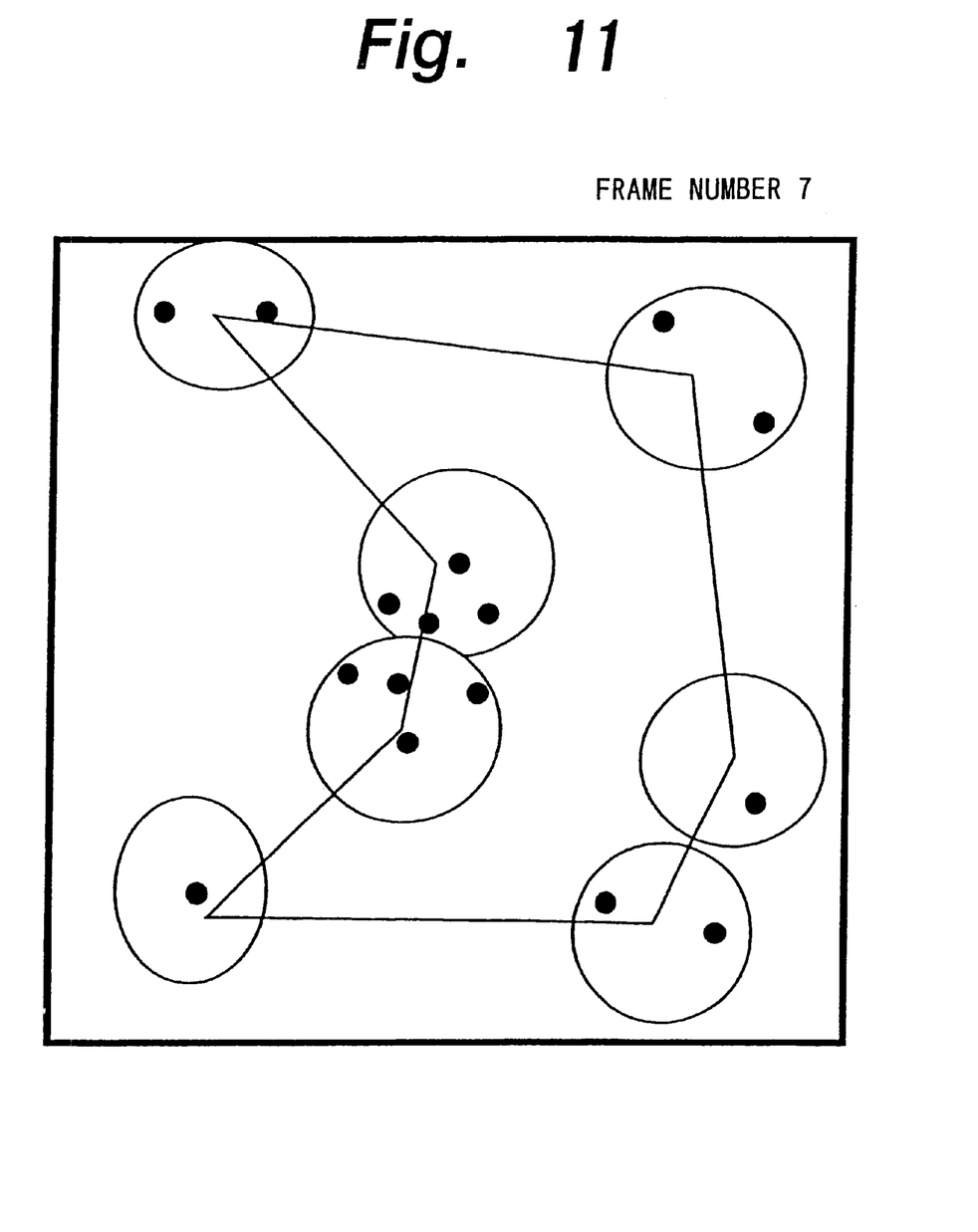
FIG. 11 is a schematic diagram for explaining a method of solving a traveling salesman problem using movable-frame renormalization transformation.
Figure 12:
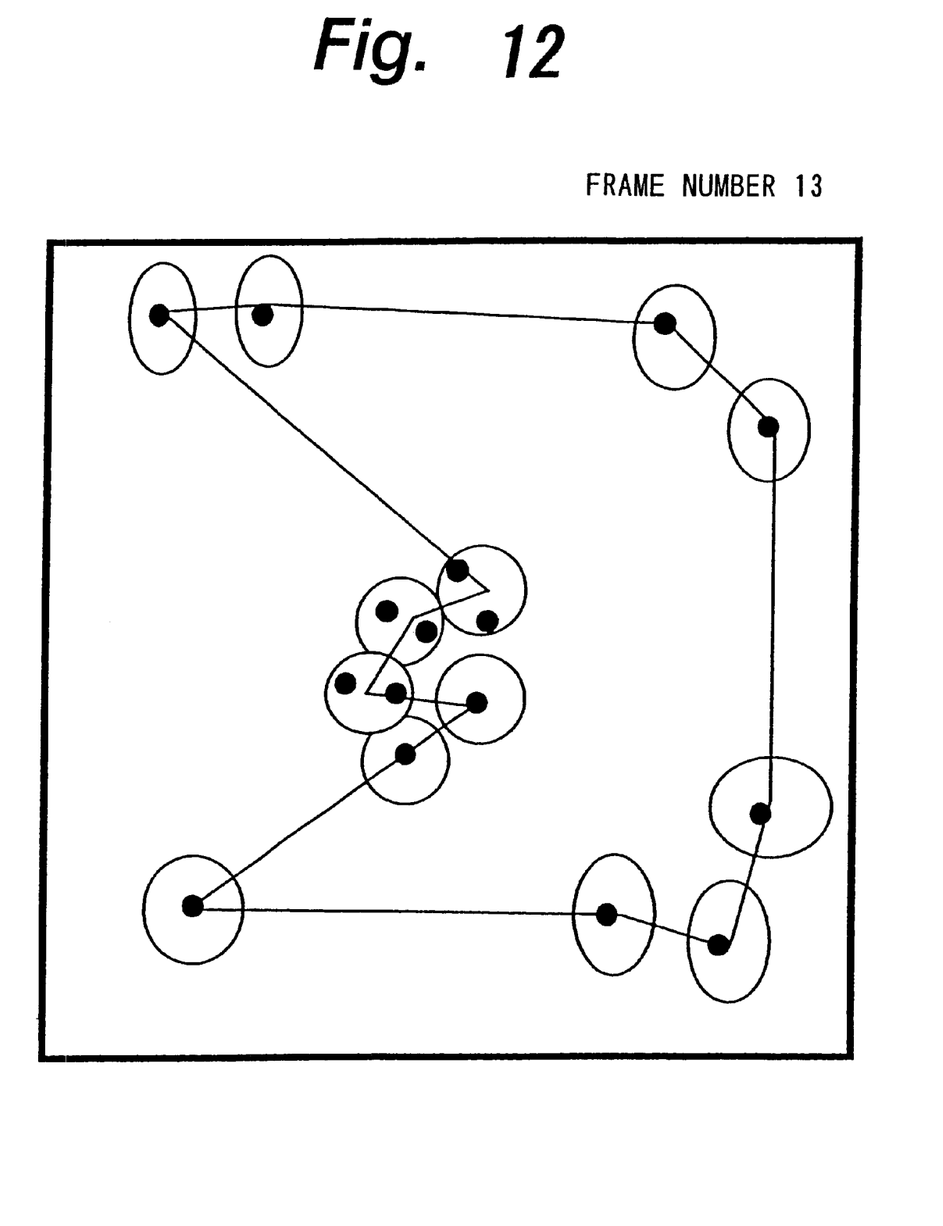
FIG. 12 is a schematic diagram for explaining a method of solving a traveling salesman problem using movable-frame renormalization transformation.

For easier understanding of the method of movable-frame renormalization group, a simple example is explained with reference to drawings. Assume that black points in FIG. 9 represent initial positions of cities. FIG. 10 shows an example in which a traveling salesman problem with five frames has been solved, with a turn line. In FIG. 11, movable frames are smaller. Therefore, although the cities are covered by seven frames, it can be regarded that central one and bottom-right one of five frames are separated. Therefore, using the solution of the traveling salesman problem with five frames, a traveling salesman problem with seven frames can be easily solved, and its solution is the turn line of FIG. 11. FIG. 12 shows an example in which movable frames have been made smaller into 13 frames. FIG. 12 shows the solution of a traveling salesman problem with 13 frames by using the solution of FIG. 11. In this manner, traveling salesman problems are sequentially solved while changing the size of movable frames. Once the process is executed until each frame finally contains only one city, the solution of the target problem can be obtained.

Figure 13:
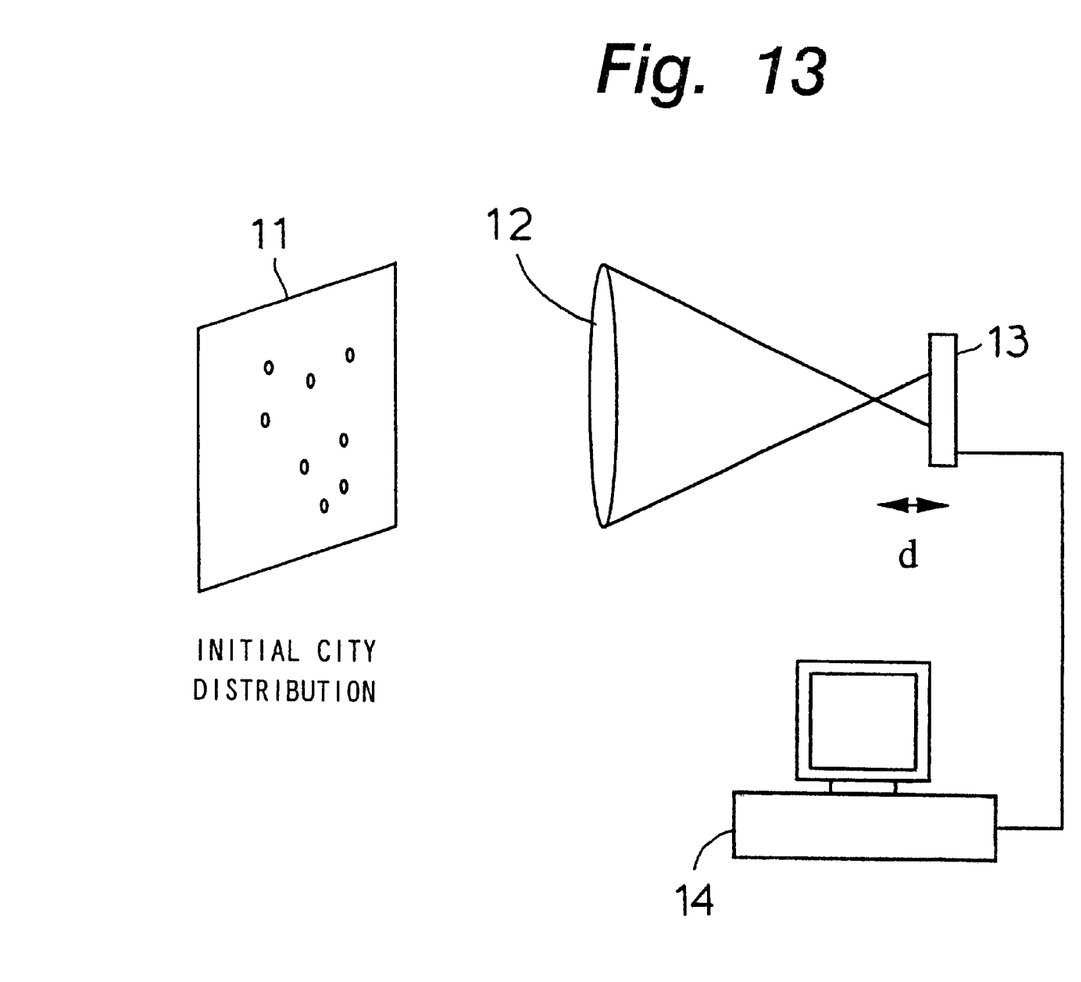
FIG. 13 is a schematic diagram that shows a method of solving a traveling salesman problem according to the first embodiment of the invention.

FIG. 13 shows an information processing method according to the first embodiment of the invention. The first embodiment uses a defocusing process for changes with time.

As shown in FIG. 13, in the first embodiment, a lens 12 is disposed such that a screen 11 indicating an initial city distribution is mirrored, and CCD 13 as an imaging device is positioned near the center of the lens 12. FIG. 13 shows CCD 13 as being provided in a location distant by d from the focalized point. Output terminal of CCD 13 is connected to a computer 14.

In the first embodiment, it is remarked that the image of the city distribution mirrored on CCD 13 can be defocused by progressively changing d. Then, while increasing d, starting from d=0, images of city distributions on the screen 11 are photographed with CCD 13, and the traveling salesman problem of the given city distribution can be progressively solved on the basis of the image data.

Figure 14:
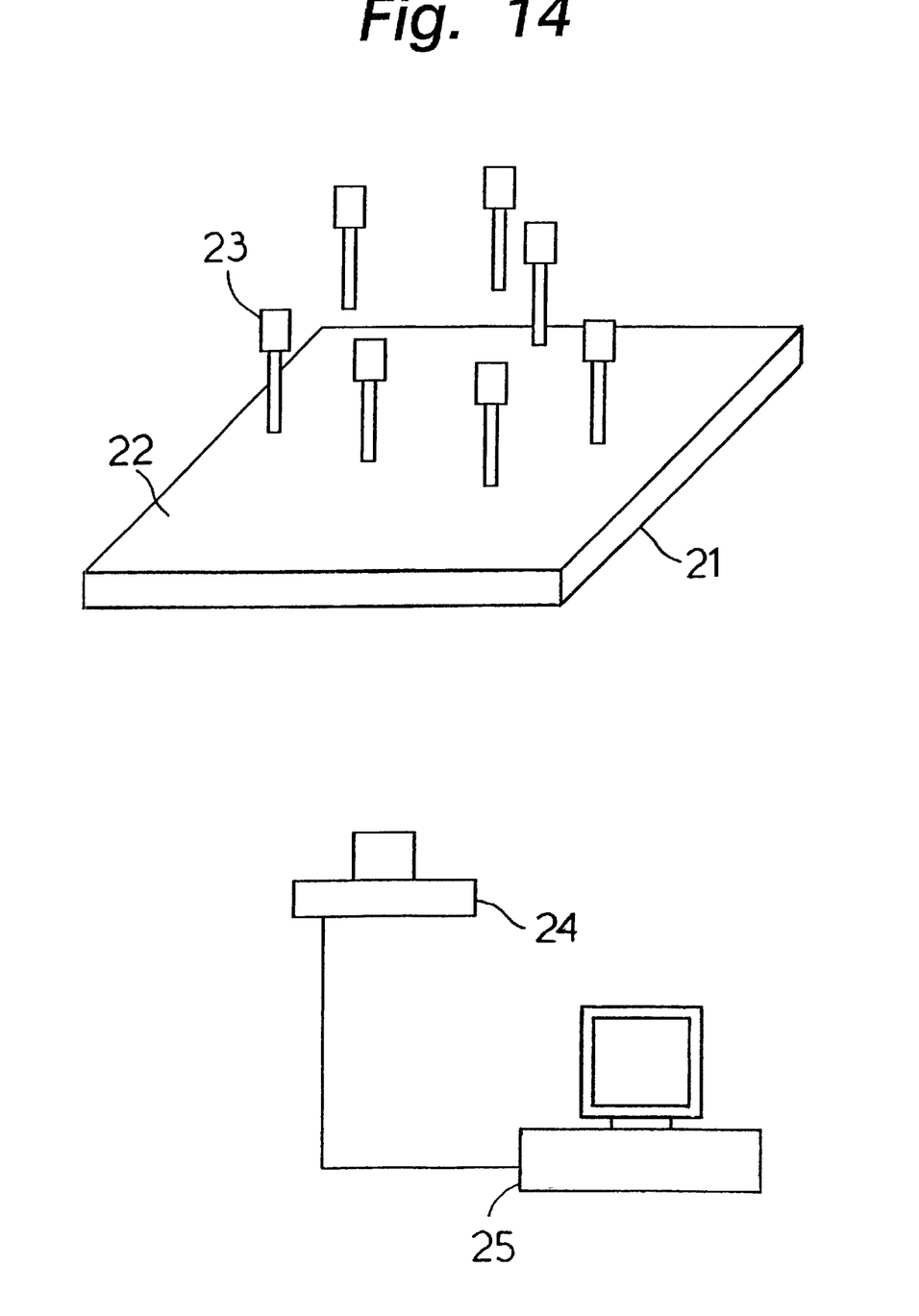
FIG. 14 is a schematic diagram that shows a method of solving a traveling salesman problem according to the second embodiment of the invention.

FIG. 14 shows an information processing method according to the second embodiment of the invention. The second embodiment uses a diffusion process for changes with time.

As shown in FIG. 14, in the second embodiment, a liquid 22 is contained in a transparent container 21 open at the top, and a plurality of medicine droppers 23 are located above the liquid 22. These medicine droppers 23 are arranged in a distribution coincident with the initial city distribution. Below the container 21, a CCD camera 24, for example, is located to take a picture of the liquid 22 inside the container 21 from below. The CCD camera 24 is connected to a computer 25 for processing image data.

In the second embodiment, when a colored liquid, such as a dye, is dropped into the liquid 22 like water, for example, the dye spreads in the liquid 22. This process is recorded from time to time with the CCD camera 24, and the data obtained are used to progressively solve the traveling salesman problem of the given city distribution.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

As described above, according to the invention, since an information carrier corresponding to the distribution of a plurality of points given on an n-dimensional space is prepared and information is processed by using time development and time reversal of the information carrier, good approximate solutions of a combinatorial optimization problem like a traveling salesman problem can be obtained quickly, and its processing apparatus can be realized in form of massively parallel exclusive devices.

What is claimed is:

1. An information processing method of finding a route minimizing a total length of lines each connecting two points among routes each once passing through all of a plurality of points given on an n-dimensional plane executed using an information processing apparatus, comprising the steps of:

preparing information from an information carrier corresponding to a distribution of a plurality of points given on an n-dimensional space (where n is an integer not smaller than 2); and using time development and time reversal of the information carrier to process the prepared information.

2. The information processing method according to claim 1 wherein said information carrier is a density of particles corresponding to the distribution of the given points, and the changes over time resulting from a diffusion process of the particles is used as the time development and time reversal.

3. The information processing method according to claim 1 wherein said information carrier is an optical intensity corresponding to the distribution of the given points, and the changes over time resulting from a defocusing process of the optical intensity is used as the time development and time reversal.

4. An information processing apparatus for finding a route minimizing a total length of lines each connecting two points among routes each once passing through all of a plurality of points given on an n-dimensional plane, comprising:

preparation means for preparing information from an information carrier corresponding to a distribution of a plurality of points given on an n-dimensional space (where n is an integer not smaller than 2), and processing means for processing the prepared information using time development and time reversal of the information carrier.

5. The information processing apparatus according to claim 4 wherein said information carrier is a density of particles corresponding to the distribution of the given points, and the changes over time resulting from a diffusion process of the particles is used as the time development and time reversal.

6. The information processing apparatus according to claim 4 wherein said information carrier is an optical intensity corresponding to the distribution of the given points, and the changes over time resulting from a defocusing process of the optical intensity is used as the time development and time reversal.

* * * * *